(12) United States Patent
Enig et al.

(10) Patent No.: US 6,926,049 B1
(45) Date of Patent: Aug. 9, 2005

(54) HOSE-AND-DROGUE IN-FLIGHT REFUELING SYSTEM

(75) Inventors: Eric N. Enig, Bethesda, MD (US); Julius W. Enig, Calverton, MD (US)

(73) Assignee: UAV Refueling Inc., Silver Spring, MD (US)

( * ) Notice: Subject to any disclaimer, the term of this patent is extended or adjusted under 35 U.S.C. 154(b) by 0 days.

(21) Appl. No.: 10/226,134

(22) Filed: Aug. 23, 2002

(51) Int. Cl.$^7$ ............................................. B64D 39/00
(52) U.S. Cl. ........................................ 141/387; 137/615
(58) Field of Search ............................. 141/279, 382, 141/387, 388; 137/615, 616, 899.2; 244/113, 244/136, 135 A, 135 R

(56) References Cited

U.S. PATENT DOCUMENTS

| | | | |
|---|---|---|---|
| 5,241,722 A | * | 9/1993 | Rohrlick et al. ............. 14/71.5 |
| 5,326,052 A | * | 7/1994 | Krispin et al. ........... 244/135 A |
| 5,393,015 A | * | 2/1995 | Piasecki .................. 244/135 A |
| 6,601,800 B2 | * | 8/2003 | Ollar ....................... 244/135 A |
| 6,604,711 B1 | * | 8/2003 | Stevens et al. .......... 244/135 A |

* cited by examiner

*Primary Examiner*—J. Casimer Jacyna
(74) *Attorney, Agent, or Firm*—Browdy and Neimark, P.L.L.C.

(57) ABSTRACT

An in-flight hose-and-drogue refueling system composed of: a refueling hose-and-drogue unit extending from a refueling aircraft for engaging with a refueling probe of an aircraft to be refueled and; a drogue steering assembly for steering the drogue, the drogue steering assembly including a plurality of individually controllable, compressed air driven thrusters, and a compressed air supply line extending along the hose for supplying compressed air to the thrusters, wherein the hose and the supply line form a unit having a circular outline.

11 Claims, 7 Drawing Sheets

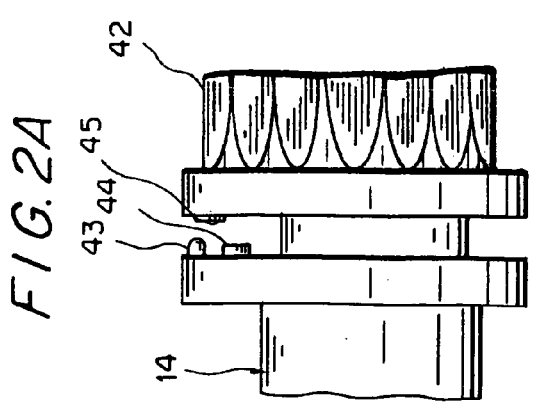
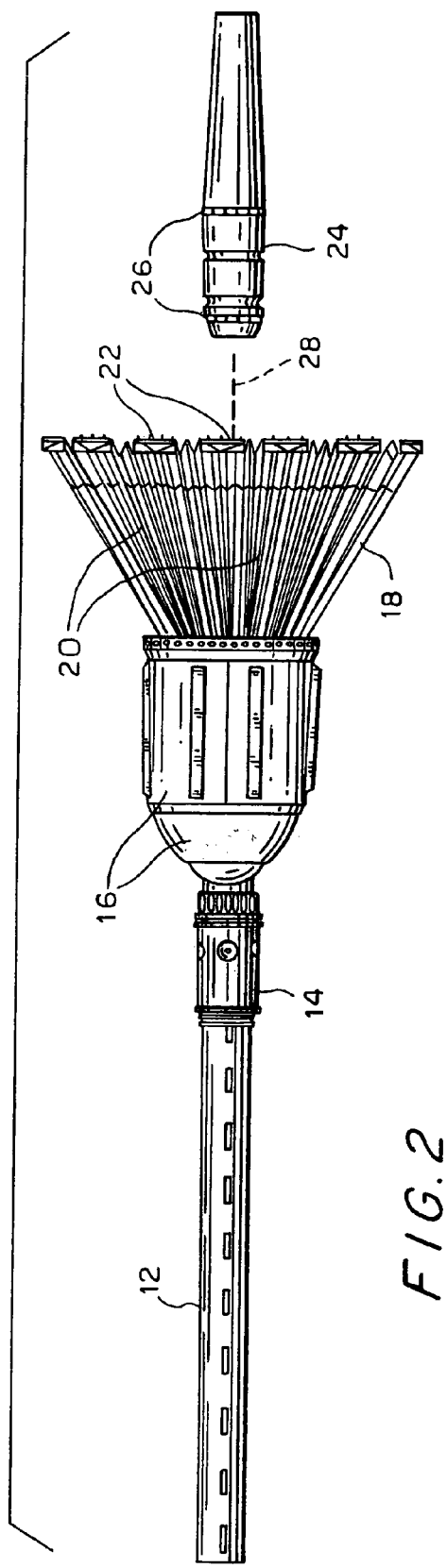
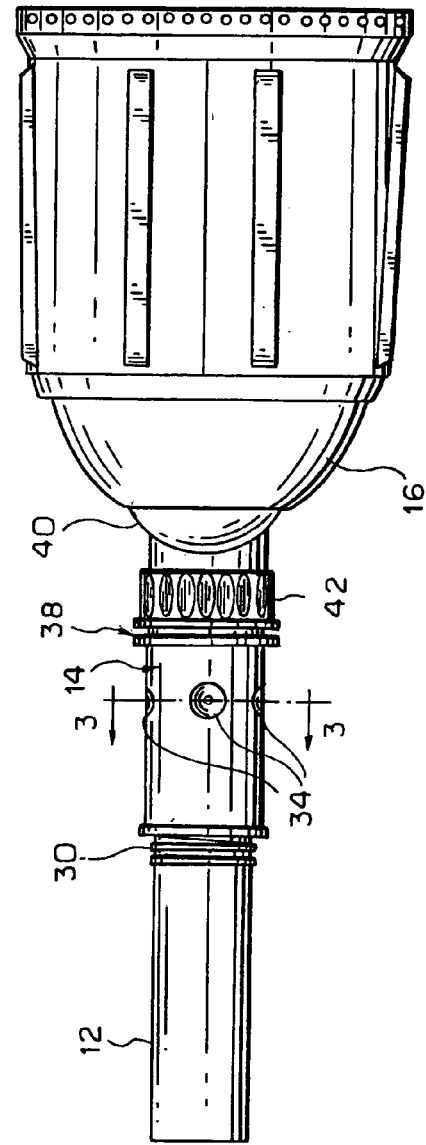

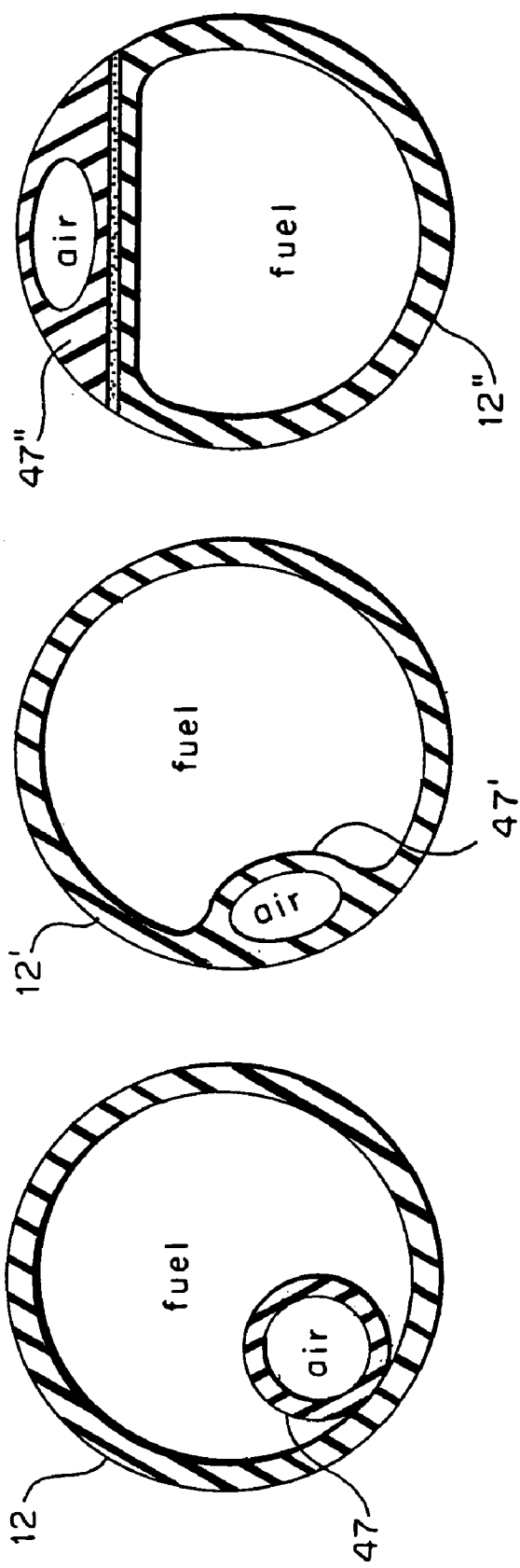

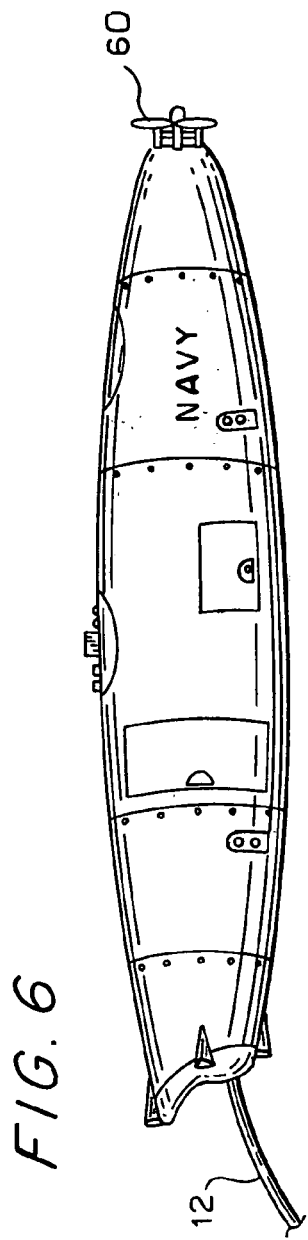
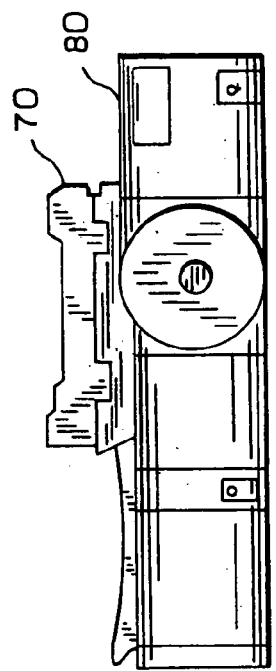
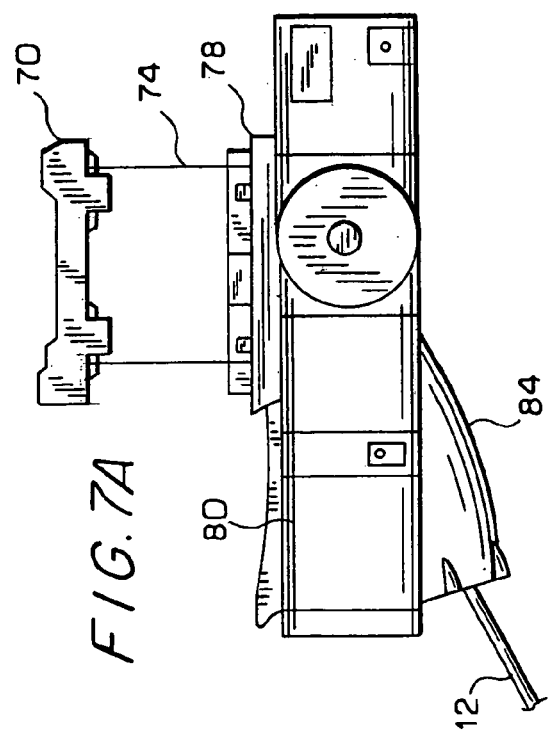
FIG. 6
FIG. 7B
FIG. 7A

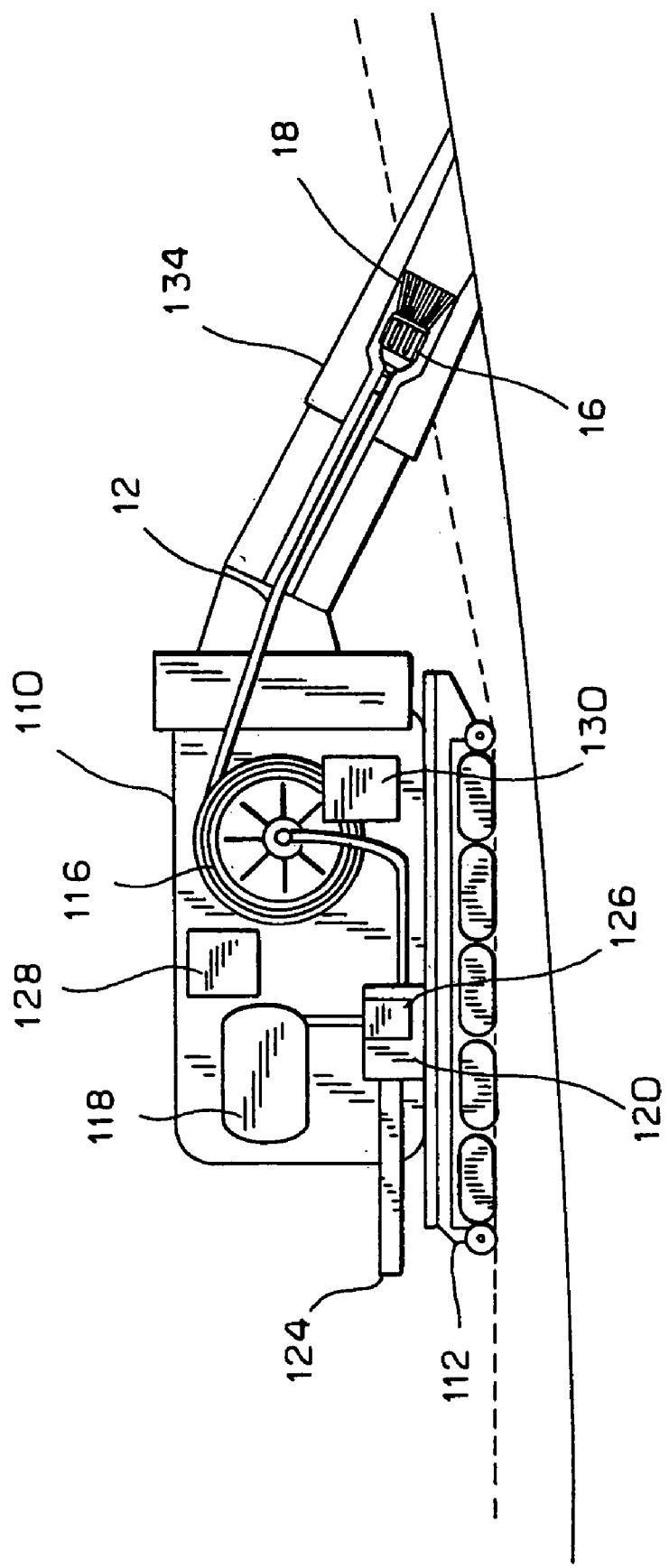

HOSE-AND-DROGUE IN-FLIGHT REFUELING SYSTEM

BACKGROUND OF THE INVENTION

The present invention relates to automatic hook-up of a hose-and-drogue aerial refueling apparatus to a receiver aircraft probe and, more particularly, to apparatus and methods for in-flight hose-and-drogue refueling using electrooptical technology.

The usefulness of air refueling became apparent to the military almost as soon as they started using aircraft. The main advantage of air refueling is obvious: it enables aircraft to stay airborne longer. Since most aircraft are incapable of taking off with maximum fuel and full payload, without in-flight refueling there is always a balance to be struck between range, payload, and fuel. Air refueling is more than just a range stretcher: it allows one to carry out missions with a smaller number of sorties, or alternatively, fewer aircraft.

One approach to in-flight refueling is the hose-and-drogue system, in which a drogue attached to a fuel hose is extended from the refueling aircraft's belly or wings. The receiver aircraft is equipped with a fixed or retractable probe and the receiving aircraft's pilot flies the probe into the drogue.

The advantages of the hose-and-drogue system are the following: (a) up to three receivers can take fuel simultaneously; (b) if one hose/drogue unit (HDU) becomes unserviceable, the tanker still can offload its fuel; (c) the HDU is inherently safer than the heavy, rigid boom, which is restricted in its movements; (d) it is easier to install on non-purpose-built aircraft; and (e) it is compatible with most receivers, e.g., fixed wings, as well as rotorcraft.

There were, however, two disadvantages to early hose and drogue system: it has lower fuel transfer rates than the boom system, and the drogue is uncontrollable and is susceptible to winds and gusts. In bad weather conditions and particularly in low level refueling situations the hookup process was very difficult and demanded excessive receiving aircraft pilot maneuvers. Since the aircraft &o be refueled was likely to be already low on fuel, excessive maneuvering could result in the necessity to abandon the aircraft.

U.S. Pat. No. 5,326,052, which issued to Krispin et al. on Jul. 5, 1994 (hereinafter the '052 patent), and the entire disclosure of which is incorporated herein by reference, discloses a system designed to overcome the problem of drogue instability by providing a system with means for both drogue steering and drogue motion measurement, thus enabling either stabilization of the drogue or, alternatively, fully automatic hookup.

Specifically, the system disclosed in the '052 patent includes a plurality of miniature, pressurized gas thrusters mounted, preferably equally spaced, on the perimeter of a drogue in such way that activation of any thruster generates a force in a direction perpendicular to the fuel outlet nozzle. In principle, four thrusters are sufficient. Two are required to control the drogue in up-and-down motion and two in the sideways motion. The position of the drogue is measured by electrooptical position-sensing devices.

The measurement system consists of a plurality of light sources (LS) such as Light Emitting Diodes (LEDs) or Laser Diodes (LDs) mounted at a certain distance from the end of the receiving fuel probe, a plurality of sensors each comprising a lens and a position-measuring photodetector that is mounted on the perimeter of the drogue with its sensitive area directed toward the receiving aircraft, and a processing electronic circuit for calculating the position of the light-source assembly relative to the detector assembly and computing the control commands to the thrusters.

In accordance with one preferred form of the invention disclosed in the '052 patent, the measured position of the drogue relative to the probe of the receiving aircraft is used to determine the control commands to the thrusters so that the drogue will track the position of the probe in order to achieve automatic hookup. In such an arrangement the pilot of the receiver aircraft is required to approach the vicinity of the tanker aircraft; once the two aircraft have closed to a certain distance, the automatic control system of the drogue is activated and guides the drogue until contact with the incoming probe has been achieved.

In accordance with an alternative form of the invention disclosed in the '052 patent, measurements are made of the drogue position relative to the tanker aircraft, either belly or wings, and are used to control the motion of the drogue so as to stabilize or, equivalently, to minimize the motion of the drogue relative to the tanker aircraft. In such an arrangement, the pilot of the receiver aircraft is required to track the drogue, which has been stabilized relative to the tanker. The tanker is much less susceptible to wind gusts and turbulence.

BRIEF SUMMARY OF THE INVENTION

The present invention provides a number of improvements to the systems disclosed in the '052 patent.

Specifically, the invention provides an in-flight hose-and-drogue refueling system comprising, in combination: a refueling hose-and-drogue unit extending from a refueling aircraft for engaging with a refueling probe of an aircraft to be refueled; and a drogue steering means for steering the drogue, said drogue steering means comprising a plurality of individually controllable, compressed air driven thrusters, and a compressed air supply line extending along the hose for supplying compressed air to said thrusters, wherein said hose and said supply line form a unit having a circular outline.

The invention further provides a refueling hose-and-drogue unit for airborne refueling of an aircraft, said unit comprising a hose, a drogue, an infitting that attaches said hose to said drogue, and a plurality of thrusters secured to said infitting and operable to control the position of said drogue in flight.

The invention further provides a refueling probe installable in an aircraft for engaging a drogue to enable the aircraft to be refueled in flight, said probe comprising a light source and electrical wires or optical fibers for supplying lighting energy to said light source, wherein said probe comprises a tube having a wall and said electrical wires or optical fibers are embedded in said wall.

The invention further provides an in-flight hose-and-drogue refueling system comprising: a housing configured to be housed in a weapons bay of a military aircraft or to be suspended below an aircraft; and a refueling hose-and-drogue unit installed in said housing.

BRIEF DESCRIPTION OF THE DRAWINGS

FIG. 1 is an elevational view of the distal end of a hose-and-drogue refueling system according the invention.

FIG. 2 is an elevational view showing several components of the system of FIG. 1 to a larger scale.

FIG. 2A is a detail view of a portion of the structure shown in FIG. 2.

FIGS. 4A, 4B and 4C illustrate three possible forms of construction for a component of a system according to the invention.

FIG. 6 is an elevational view of one possible housing for a system according to the invention.

FIGS. 7A and 7B are elevational views of a second possible housing for a system according to the invention in two operating states.

FIG. 9 is an elevational, pictorial view of a third possible housing for a system according to the invention.

DETAILED DESCRIPTION OF THE INVENTION

Figure 3:
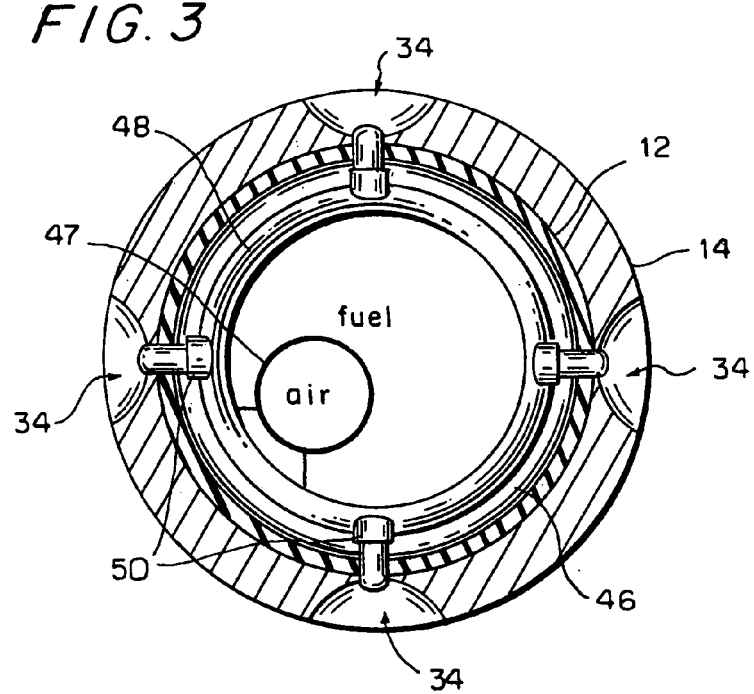
FIG. 3 is cross-sectional view taken along line 3—3 of FIG. 2.

FIG. 1 is an elevational view of the distal end of a hose-and-drogue refueling system according the invention, together with the inlet end of a probe that extends from an aircraft that is to be refueled (not shown). The hose-and-drogue system includes a hose 12 for delivering fuel, an infitting 14 secured to the distal end of hose 12, a coupler assembly 16 secured to the distal end of infitting 14, that is the end remote from hose 12, and a drogue, often referred to as a basket, 18 fixed to assembly 16. Drogue 18 is provided with a series of ribs 20 that provide aerodynamic stability and carries, at its distal end, a group of position sensing devices (PSDs) 22. Probe 24 is provided at its fuel-receiving end with two concentric rings of light sources 26 for producing light that is detected by PSDs 22. The manner in which light sources 26 interact with PSDs 22 is described in detailed in the above-cited '052 patent. Essentially, PSDs 22 produce position signals that are used to actuate the thrusters in a manner to align the longitudinal axis 28 of the drogue with that of probe 24.

Light sources 26 are supplied with lighting energy via electrical wires or optical fibers. According to a feature of the invention, probe 24 is constituted by a tube having the electrical wires or optical fibers embedded in its wall. This tube may be made of a suitable composite material.

Light sources 26 can be IR sources and PSDs 22 can be IR sensors.

FIG. 2 is an elevational view showing infitting 14 and coupler assembly 16 to a larger scale. Infitting 14 is provided with at least two gripping rings 30 that are pressed, or crimped, against the outer surface of hose 12 in order to form a secure, nonmovable connection between hose 12 and infitting 14. Infitting 14 can also be provided at its interior with gripping elements that engage the inner wall of hose 12 to further secure the connection therebetween. Infitting 14 is equipped with thrusters, preferably four in number, that are actuatable to displace the drogue in directions transverse to longitudinal axis 28. These thrusters include outlet nozzles that constituted by four radial passages 34 that are formed in infitting 14 and are distributed uniformly around the circumference of infitting 14. Infitting 14 further carries a set of PSDs 38 that are arranged to detect light from a light source carried by the refueling aircraft. PSDs 38 can be coupled to control elements for the thrusters in order to stabilize that drogue relative to the refueling aircraft. Such an arrangement is described in the above-cited '052 patent, particularly with reference to FIG. 5 of that patent.

The light source on the refueling aircraft can be an IR source and PSDs 38 can be IR sensors.

Coupler assembly 16 includes a ball joint 40 that couples assembly 16 to drogue 18 in a manner to permit limited pivotal movement of drogue 18 about two axes perpendicular to longitudinal axis 28 of the drogue. Coupler assembly 16 further includes a joint 42 that forms a rotatable coupling with infitting 14. This rotatable coupling allows coupler assembly 16 and drogue 18 to rotate about longitudinal axis 28 without twisting hose 12 or infitting 14, so that the relative orientations of nozzles 34 are not varied and hose 12 is not subject to damage.

As described in the '052 patent, suitable circuitry is connected between PSDs 38 and the thrusters to allow the position of the drogue to be controlled to maintain the drogue relatively stationary relative to the refueling aircraft.

PSDs 22 can be constituted by self-contained wireless transmitting devices that transmit signals to wireless receivers (not shown) in infitting 14 to provide information about the position of light sources 26 relative to longitudinal axis 28. Each transmitting device can have a different carrier frequency or can be digitally coded to be receivable only by a respective one of the wireless receivers. Thus, each wireless receiver produces position signals associated with only one PSD 22. The wireless receivers have outputs that are supplied to signal processing circuitry in the refueling aircraft. The wires coupling the receivers to the circuitry can be embedded in hose 12.

Since coupler assembly 16 and drogue 18 are subject to rotation about axis 28 when being dragged through the air, provision must be made to identify the angular positions of PSDs 22, and thus of drogue 18, associated with position signals produced by the wireless receivers.

One possible arrangement for effecting such identification is shown in FIG. 2A. A flange on infitting 14, which may carry PSDs 38, is provided with a light source 43 and, adjacent thereto, a light detector 44. A flange forming part of joint 42, which will rotate with coupler assembly 16, carries a small reflecting element 45 having a limited angular extent. Each time element 45 moves opposite light source 43 and light detector 44, the latter will produce a light detection pulse. This pulse is supplied as a gate signal to the wireless receivers to trigger the delivery of position signals to the signal processing circuitry in the refueling aircraft. Thus, these position signals are associated with a defined angular position of PSDs 22. Operating power may be supplied to light source 43 by a conductor embossed in hose 12.

Figure 3A:
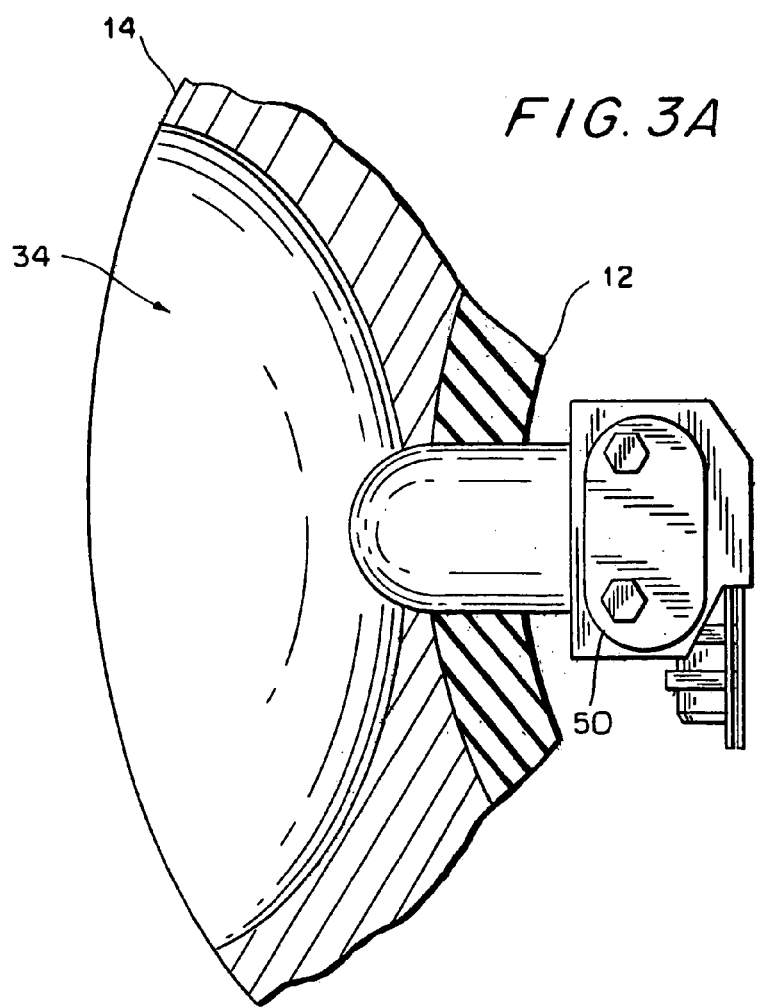
FIG. 3A is a detail view of a portion of the structure shown in FIG. 3.

FIG. 3 is a cross-sectional view taken along line 3—3 of FIG. 2. As shown in FIG. 3, infitting 14 further includes an interior gripping ring 46 that presses against the interior wall of hose 12. Within hose 12 there is carried a compressed air hose 47 having an outlet that is connected in any suitable manner to an annular compressed air distributor manifold 48. Manifold 48 has four outlets each coupled to a respective thruster control valve 50, which may be composed of a solenoid and examples of which are already known in the art. Each control valve 50 is connected to control the supply of compressed air to a respective outlet nozzle 34. One thruster outlet nozzle 34 and control valve 50 are shown in greater detail in FIG. 3A.

FIGS. 4A and 4B and 4C illustrate three possible arrangements of the fuel hose and air hose according to the present invention. All of these embodiments have in common that the fuel and air hoses form an assembly having a circular outline. Such an outline is preferred because it facilitates reeling of the assembly into the refueling vehicle.

In FIG. 4A hoses 12 and 47 are separately fabricated and hose 47 can simply extend freely along hose 12, except at the outlet end of hose 47, where it is connected to distributor 48 of FIG. 3.

In the embodiment of FIG. 4B, fuel hose 12' and air hose 47' are formed by coextrusion.

In the embodiment shown in FIG. 4C fuel hose 12" and air hose 47" are each formed to have one flat side, along which the two hoses are bonded together by any suitable bonding technique. This bond may be formed in order to separate when a certain tension is created between hoses 12" and 47". Such a tension may be created, for example, if an accidental mechanical rupture occurs in air hose 47", resulting in a leakage of compressed air toward fuel hose 12". Thus the bond should be formed to cause the hoses to separate when a tension force between the hoses is below that which corresponds to a leakage pressure that would rupture fuel hose 12".

In all of the illustrated embodiments of the invention, because the air hose is filled with air at a high pressure, for example in the range 340–455 psi, the air hose has a rigidifying effect on the fuel hose, thereby reducing the magnitude of transverse movements of the fuel hose while being dragged through the air.

With regard to the embodiment shown in FIG. 4A, air hose 47 can be installed, as noted above, to be freely moveable within fuel hose 12. Alternatively, air hose 47 can be fixed in position relative to fuel hose 12 by spacers provided at intervals within fuel hose 12.

Figure 5:
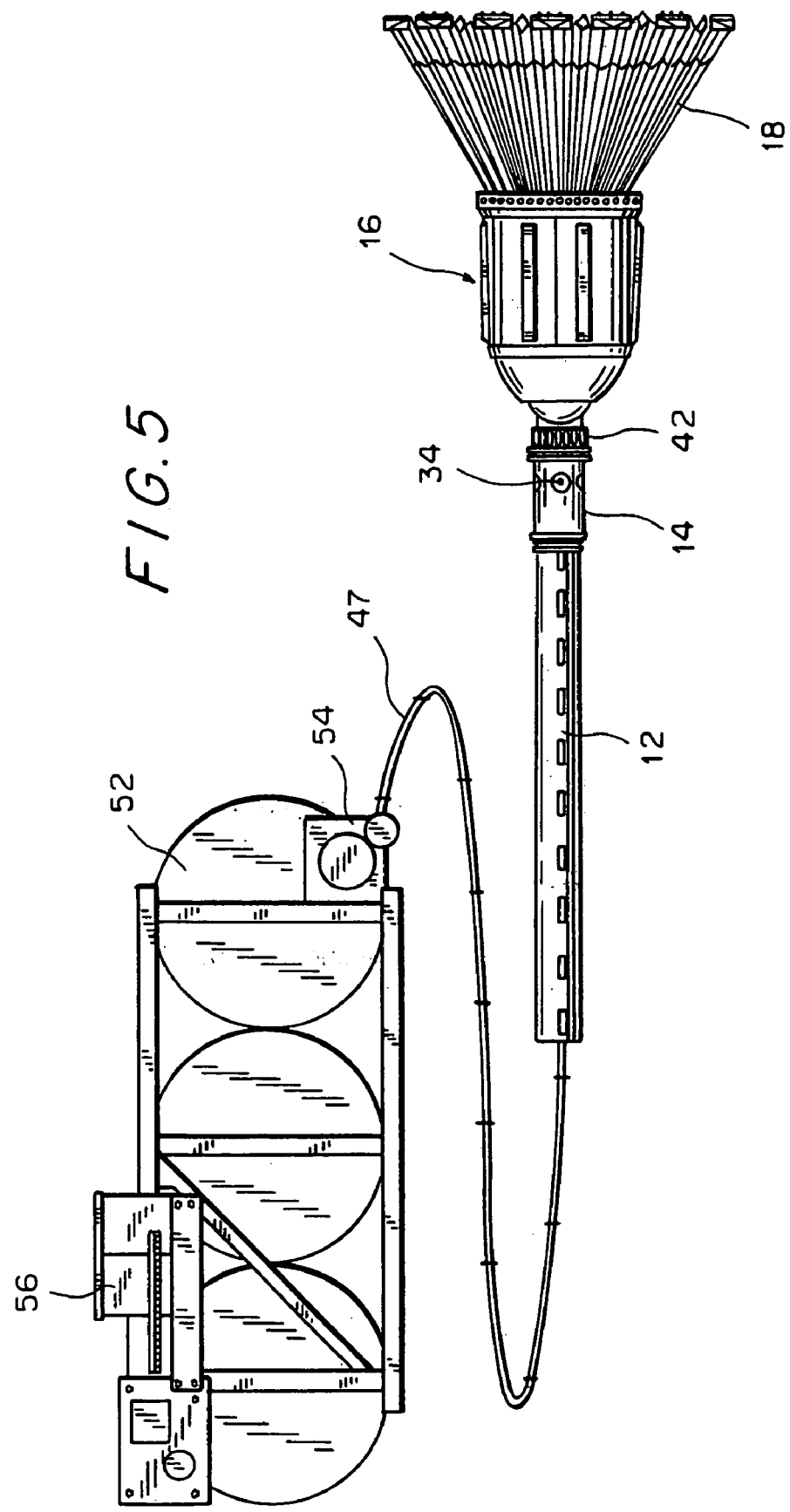
FIG. 5 is an elevational, pictorial view of one exemplary embodiment of a compressed air supply arrangement for use in a system according to the invention.

FIG. 5 is an elevational, pictorial view of one exemplary embodiment of a compressed air supply arrangement for use in a system according to the invention. The arrangement includes a high pressure vessel 52 which, simply by way of nonlimiting example, is composed of three spheres coupled together by suitable fittings. The arrangement further includes a pressure regulator 54 connected between vessel 52 and hose 47 and a miniature high-pressure compressor 56 that is connected to maintain the desired air pressure within vessel 52.

According to one feature of the invention, pressure vessel 52 may be either clad or lined with a suitable composite material to prevent the vessel from exploding and from being penetrated by at least some projectiles. Any known composite material that is suitable for this purpose may be used.

Heretofore, in-flight refueling has been performed by refueling aircraft that are specially equipped to perform this function. This limits the number of aircraft available to perform this function. According to a further feature of the present invention, a refueling system is installed in a vessel, or housing, that can be mounted on or in a variety of aircraft that are configured to be used for other purposes. Two embodiments of such a housing are illustrated in FIGS. 6 and 7A and 7B.

FIG. 6 illustrates a pod that is constructed to be mounted beneath the fuselage or beneath a wing of a variety of large aircraft and that contains the required high pressure air supply, stabilization system light source, power system, control circuitry and fuel tank. The pod illustrated could include a turbine driven by a propeller 60 located at the front of the pod to generate power for operating the refueling system. Propeller 60 would be rotated by air flowing past the pod when the aircraft to which the pod is mounted is in flight.

The pod is open at its rear end and hose 12, containing hose 47, would be deployed out of the open rear end of the pod.

FIGS. 7A and 7B illustrate a vessel 80 that would be installed in the weapons bay or bomb bay of a military aircraft, which could even be an unmanned, remotely controlled aircraft. The weapons bay can be equipped with a support bracket 70 provided with cables 74 that can be attached to a mounting bracket 78 on vessel 80. In order to load vessel 80 into a weapons bay, cable 74 would be attached to bracket 80 and would then be wound onto motor driven reels carried by bracket 70 in order to bring vessel 80 into the stowed position shown in FIG. 7B. As in the case of the embodiment of FIG. 6, vessel 80 would contain a compressed air supply, a stabilization light source, control circuitry and all other equipment required for the refueling operation. The fuel tank can be installed in vessel 80 or in the aircraft. Vessel 80 is equipped with a cowl 84 that is mounted to pivot downwardly into the position shown in FIG. 7A when a refueling operation is to be performed. Cowl 84 provides aerodynamic stabilization and provides a passage for deploying hose 12.

Figure 8:
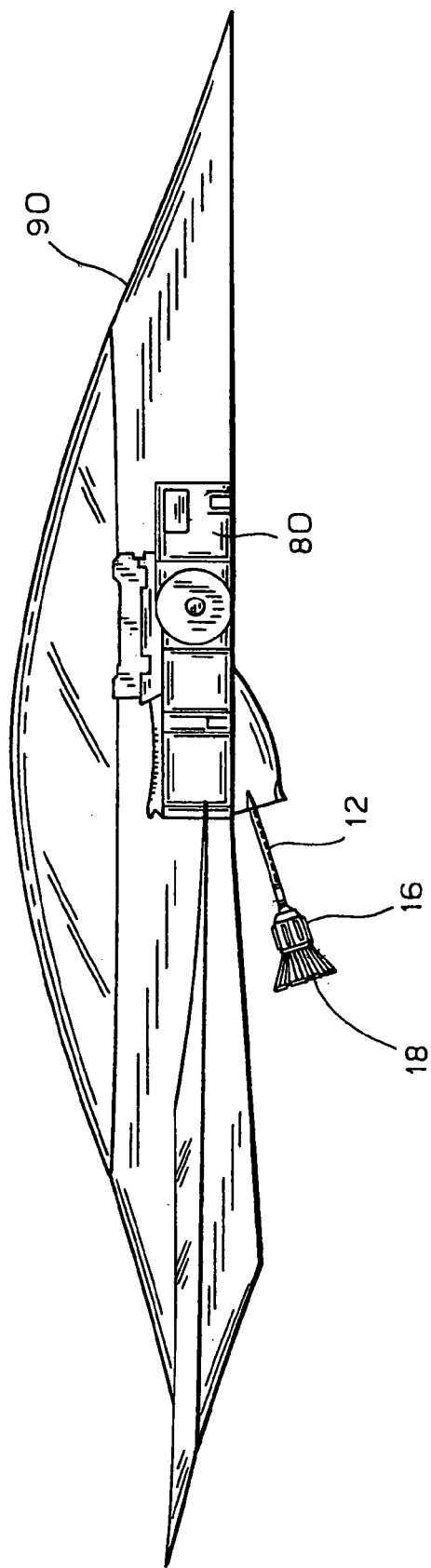
FIG. 8 is an elevational view of an aircraft equipped with the housing shown in FIGS. 7A and 7B.

FIG. 8 shows housing 80 installed in the weapons bay of an unmanned military aircraft 90.

FIG. 9 shows a housing 110 mounted on a pallet 112 that can be installed in the hold of a cargo or tanker aircraft. Housing 110 is shown with a side removed to allow viewing of all of the components of a refueling system according to the invention, which are installed in the housing. These components include a drum, or reel, 116 on which hose 12 is wound, a source 118 of high pressure air coupled to hose 47, a fuel pump and pressure supply valve 120 coupled between a fuel supply line 124 connected to a fuel tank in the aircraft and hose 12, a coupling unit 126 for connecting source 118 to the high pressure air supply hose (not shown in FIG. 9), signal processing circuitry 128 and a power supply 130. The hose-and-drogue unit is shown in a stowed position in a storage tube 134 that opens to the exterior of the aircraft. Circuitry 128 is connected (not shown) by conductors in hose 12 to the various light sources, PSDs, receivers, sensors and thrusters carried by the hose-and-drogue unit. Pallet 112 with housing 110 attached can be easily loaded onto, and secured to, the bulk cargo floor of an aircraft.

In the embodiments shown in FIGS. 6–9, the high pressure air supply vessel could be wrapped in a suitable composite material and sealed with titanium for the purposes described above with reference to FIG. 5. In fact, the high pressure vessel assembly shown could be used in the vessels shown in FIGS. 6 and 7A, B.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An in-flight hose-and-drogue refueling system comprising, in combination:
   a refueling hose-and-drogue unit extending from a refueling aircraft for engaging with a refueling probe of an aircraft to be refueled; and
   a drogue steering means for steering the drogue, said drogue steering means comprising a plurality of individually controllable, compressed air driven thrusters, and a compressed air supply line extending along the hose for supplying compressed air to said thrusters, wherein said hose and said supply line form a unit having a circular cross section.

2. The system of claim 1 wherein said compressed air supply line is a single supply line for supplying compressed air to all of said thrusters.

3. The system of claim 2, further comprising a distributor that provides an annular flow path from said single supply line to said thrusters.

4. The system for claim 2, wherein said single supply line is coextensive with the hose.

5. The system of claim 2, wherein said single supply line is bonded to the hose.

6. The system of claim 5 wherein the bond between the said supply line and the hose is separable in response to a tension force between said supply line and the hose.

7. An in-flight hose-and-drogue refueling system comprising, in combination:
a refueling hose-and-drogue unit extending from a refueling aircraft for engaging with a refueling probe of an aircraft to be refueled; and
a drogue steering means for steering the drogue, individually controllable, compressed air driven thrusters, and a compressed air supply line extending along the hose for supplying compressed air to said thrusters, wherein said supply line is housed within the hose.

8. A refueling hose-and-drogue unit for airborne refueling of an aircraft, said unit comprising a hose, a drogue, an infitting that attaches said hose to said drogue, and a plurality of thrusters secured to said infitting and operable to control the position of said drogue in flight, wherein said drogue is rotatable relative to said infitting.

9. The refueling hose-and-drogue unit of claim 8, wherein said thrusters comprise outlet nozzles constituted by passages formed in said infitting.

10. The refueling hose-and-drogue unit of claim 8, wherein said infitting forms a nonmovable connection with said hose.

11. A refueling hose-and-drogue unit for airborne refueling of an aircraft, said unit comprising a hose, a drogue, an infitting that attaches said hose to said drogue, and a plurality of thrusters secured to said infitting and operable to control the position of said drogue in flight, further comprising means coupled between said infitting and said drogue for identifying the angular position of said drogue relative to said infitting.

* * * * *